United States Patent
Kobara

(10) Patent No.: US 8,447,742 B2
(45) Date of Patent: May 21, 2013

(54) STORAGE APPARATUS WHICH ELIMINATES DUPLICATED DATA IN COOPERATION WITH HOST APPARATUS, STORAGE SYSTEM WITH THE STORAGE APPARATUS, AND DEDUPLICATION METHOD FOR THE SYSTEM

(75) Inventor: Makoto Kobara, Fuchu (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 167 days.

(21) Appl. No.: 13/069,921

(22) Filed: Mar. 23, 2011

(65) Prior Publication Data

US 2011/0238634 A1    Sep. 29, 2011

(30) Foreign Application Priority Data

Mar. 24, 2010 (JP) ................................. 2010-068512

(51) Int. Cl.
G06F 17/30 (2006.01)
(52) U.S. Cl.
USPC .......................................... 707/692; 707/693
(58) Field of Classification Search
USPC ................................................ 707/692, 693
See application file for complete search history.

(56) References Cited

U.S. PATENT DOCUMENTS

| | | | |
|---|---|---|---|
| 5,990,810 A | 11/1999 | Williams | |
| 7,536,505 B2* | 5/2009 | Takakuwa | 711/114 |
| 8,285,681 B2* | 10/2012 | Prahlad et al. | 707/640 |
| 2010/0088296 A1* | 4/2010 | Periyagaram et al. | 707/705 |
| 2011/0035541 A1* | 2/2011 | Tanaka et al. | 711/103 |

OTHER PUBLICATIONS

Zhu, et al., "Avoiding the Disk Bottleneck in the Data Domain Deduplication File System", Proceedings of the 6$^{th}$ USENIX Conference on File and Storage Technologies (FAST '08), San Jose, CA, USA, pp. 1-14, (2008).
Clements, et al., "Decentralized Deduplication in SAN Cluster File System", USENIX' 09, pp. 1-14, (2009).

* cited by examiner

Primary Examiner — Mahesh Dwivedi
(74) Attorney, Agent, or Firm — Finnegan, Henderson, Farabow, Garrett & Dunner, LLP

(57) ABSTRACT

According to one embodiment, a storage apparatus includes a first storage unit, a second storage unit and a control module. The control module stores the address of a block data item and a block identifier unique to the block data item, included in a write request, in the second storage unit such that the address and the block identifier are associated with each other when a request to specify the writing of data including the block data item into the storage apparatus has been generated at a host apparatus and when the host apparatus has transmitted the write request because the data item has coincided with any one of the block data items stored in the cache of the host apparatus.

11 Claims, 12 Drawing Sheets

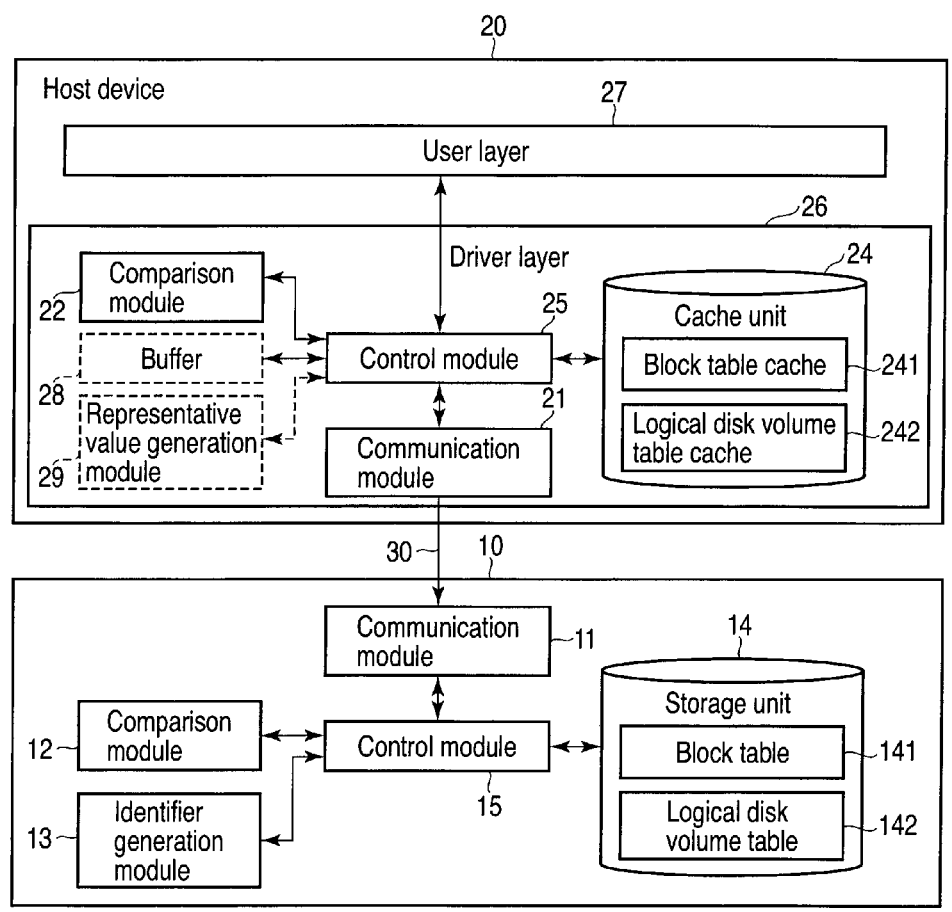
F I G. 1

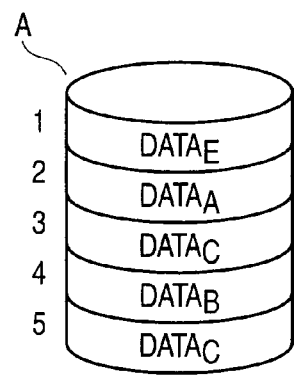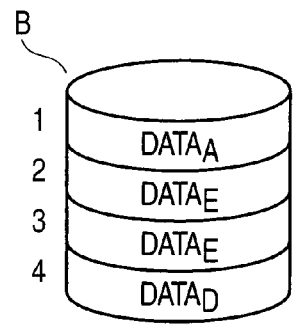
FIG. 2A  FIG. 2B
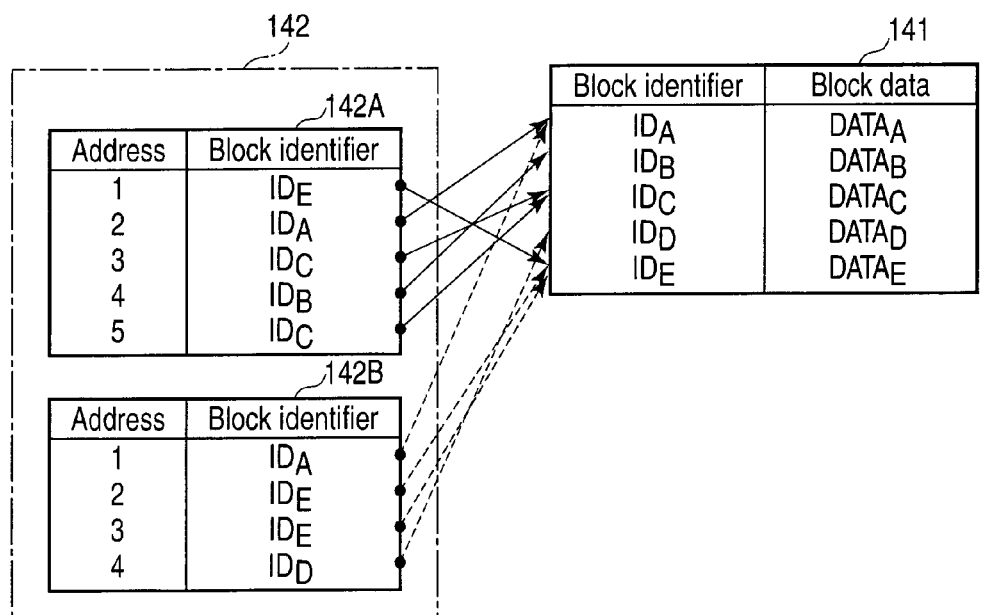
FIG. 3

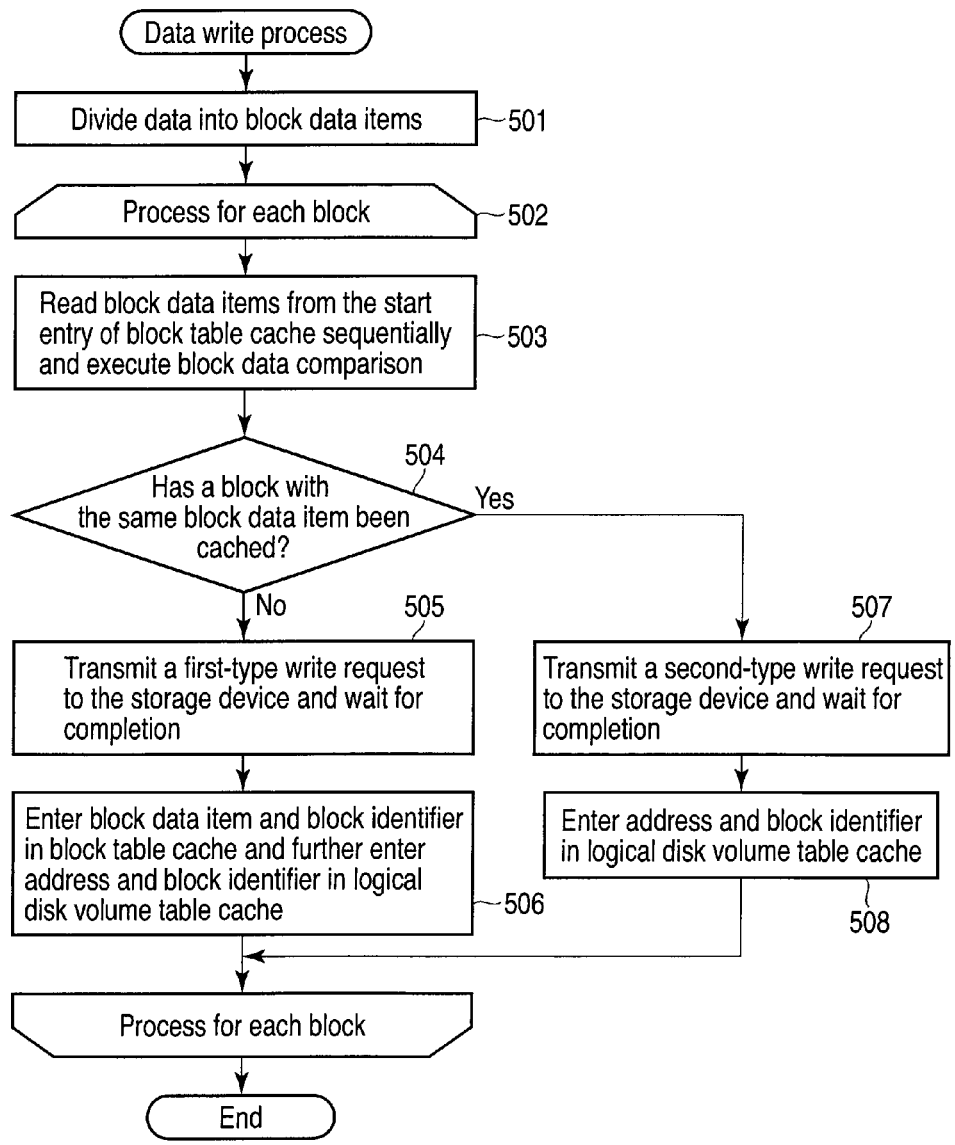
F I G. 5

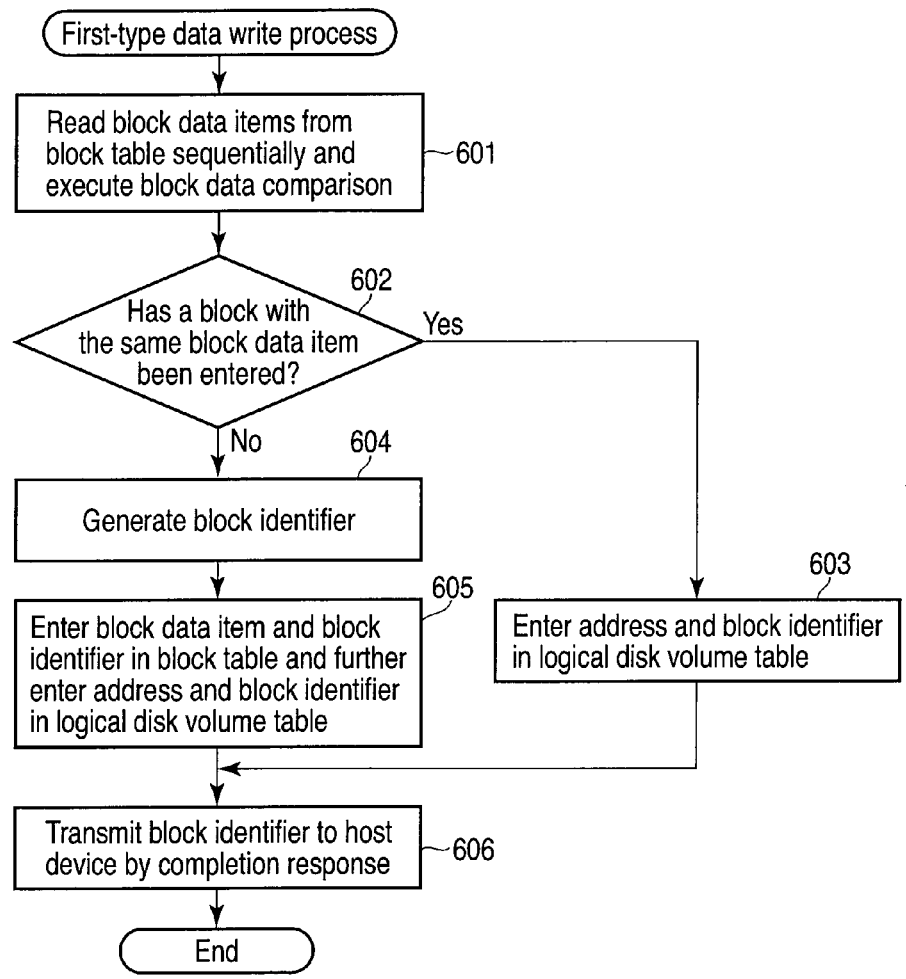
F I G. 6

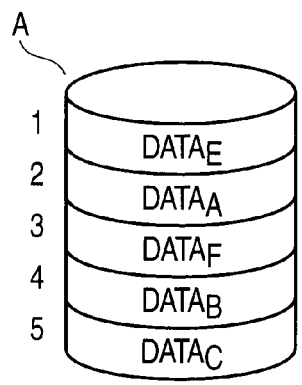 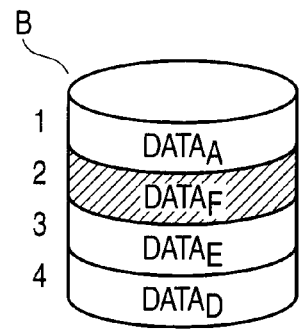
F I G. 1 1 A    F I G. 1 1 B
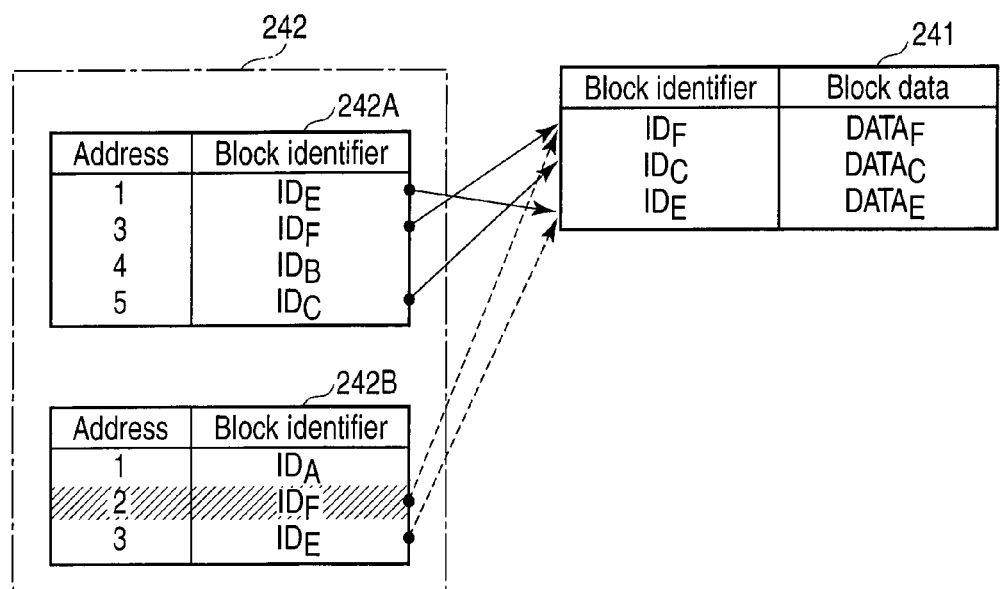
F I G. 1 2

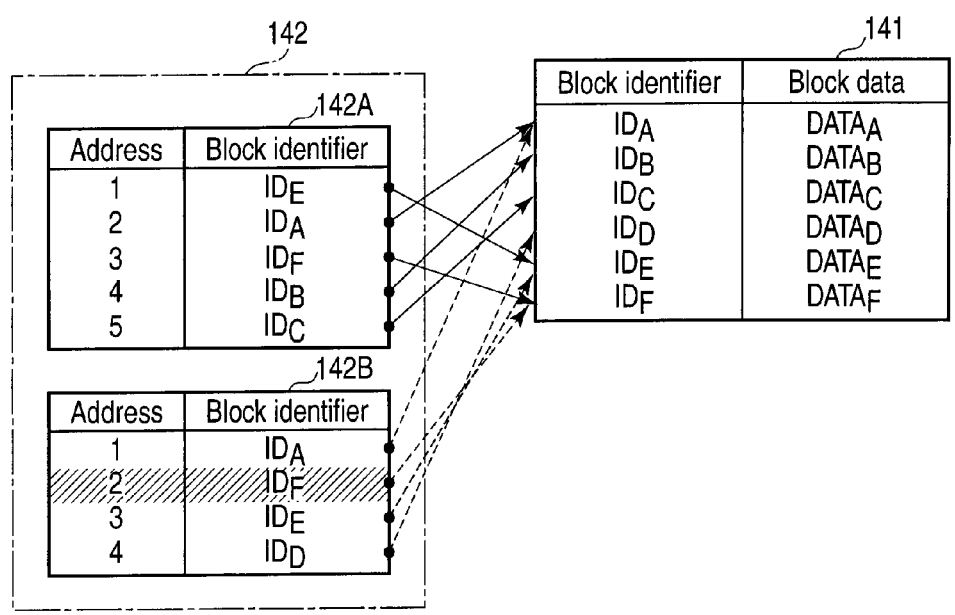
F I G. 13

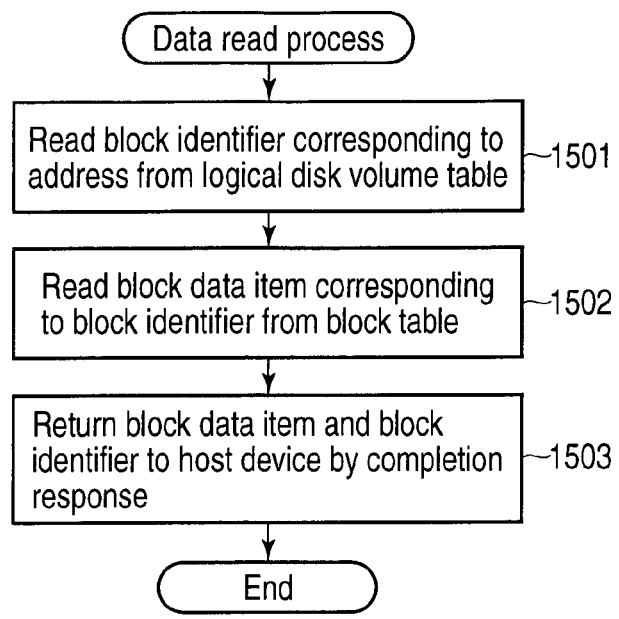
FIG. 15
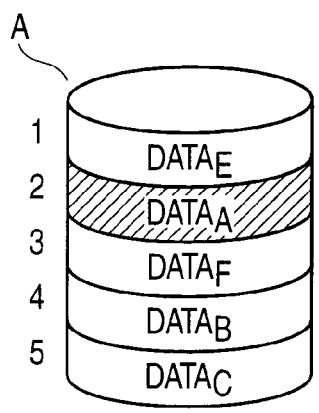 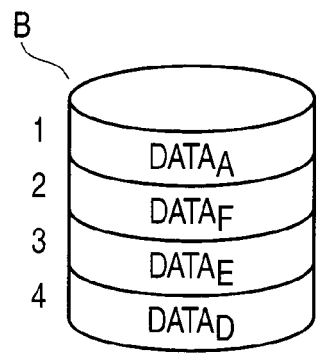
FIG. 16A  FIG. 16B

STORAGE APPARATUS WHICH ELIMINATES DUPLICATED DATA IN COOPERATION WITH HOST APPARATUS, STORAGE SYSTEM WITH THE STORAGE APPARATUS, AND DEDUPLICATION METHOD FOR THE SYSTEM

CROSS-REFERENCE TO RELATED APPLICATIONS

This application is based upon and claims the benefit of priority from Japanese Patent Application No. 2010-068512, filed Mar. 24, 2010; the entire contents of which are incorporated herein by reference.

FIELD

Embodiments described herein relate generally to a storage apparatus which eliminates duplicated data in cooperation with a host apparatus, a storage system with the storage apparatus, and a deduplication method for the system.

BACKGROUND

Nowadays, an infrastructure for managing data on government offices, companies, and individuals is growing bigger and getting more complex rapidly. Data stored in a storage device (storage apparatus), a component of the infrastructure, is also increasing steadily. In this connection, a deduplication technique (or a duplicated data elimination technique) is receiving attention as a technique for reducing the cost for storing and managing such data.

The deduplication technique is a technique for detecting duplication of data and eliminating duplicated data. Detecting duplication of data means detecting whether data with the same contents has already been stored in a storage device when storing data (hereinafter, referred to as target data) in the storage device. Eliminating duplicated data means organizing duplicated data by replacing the target data with, for example, a link when having detected duplication of data, that is, when data with the same contents as those of the target data has been stored in the storage device. With this deduplication technique, the storage capacity necessary to store data can be reduced further.

Generally, to detect at high speed whether the same data item as the target data item has been stored in the storage device, a representative value of data, such as a hash value, is often used. Specifically, in the deduplication technique, to detect a duplication, a second method of using a representative value of the target data item is used instead of a first method of comparing the target data item with all the data items stored in the storage device. In the second method, a representative value of the target data item is determined and the determined representative value is compared with each of the representative values of already stored data items.

The mainstream of conventional products to which such a deduplication technique had been applied was composed of backup products, such as backup units and virtual tape libraries (VTL), which were realized by combining a method of dividing variable length data as described in, for example, U.S. Pat. No. 5,990,810 with a deduplication technique as described in Benjamin Zhu, et al., "Avoiding the Disk Bottleneck in the Data Domain Deduplication File System," Data Domain, Inc., USENIX/FAST'08, (2008). In the case of backup use, the technical hurdles for eliminating duplications at high speed are lower than those for primary use and therefore it is easy to apply the technique to products for the following reason. The reason is that data is written in a stream (nonrandom) in backup use and once-written data is not updated frequently.

Nowadays, however, with an increasing attention to the deduplication technique, the application of the deduplication technique to a primary storage device (hereinafter, just referred to as a storage device) is also in progress. For example, the application of the deduplication technique to a shared storage device which accepts accesses from a plurality of host devices (host apparatuses) via a Storage Area Network (SAN) is also in progress. A method of applying the deduplication technique to a storage device is divided roughly into two types.

First, the procedure for eliminating duplications on the storage device side (or a first method) will be explained:

(1) A host device transfers a data item to be written to a storage device.

(2) The storage device generates a representative value of the data item from the host device on the basis of the data item.

(3) The storage device compares the generated representative value with each of the representative values of already stored data items to see if the same representative value (data item) has already been stored. The storage device writes the data item from the host device only when the same representative value has not been stored, thereby eliminating a duplicated data item.

Next, the procedure for eliminating duplications on the host device side (or a second method) will be explained:

(1) The host device generates a representative value of a write data item to be written into the storage device on the basis of the data item.

(2) The host device reads the representative values of the data items stored in the storage device from the storage device. It is common practice to speed up the reading and comparison of representative values by the host device by storing the indexes of the representative values in the storage device in advance.

(3) The host device compares the generated representative value with each of the read representative values to see if the same representative value (data item) has already been stored. The host device transfers the data item to the storage device and writes the data item in the storage device only when the same representative value has not been stored, thereby eliminating a duplicated data item.

Although the first method is currently in the mainstream, the second method has been disclosed in, for example, Austin T. Clements, et al., "Decentralized Deduplication in SAN Cluster File Systems," USENIX'09, (2009).

For the storage device to eliminate duplication, data transmission and reception between the host device and the storage device are needed. Generally, the storage device has a lower CPU performance and a lower amount of memory installed than those of the host device. Therefore, it is difficult to eliminate duplicated data at high speed in the storage device because the performance of each of the CPU and memory has a significant effect on the speed and therefore, for example, an off-load engine has to be installed.

When the host device performs the following deduplication, the data items in the storage device have to be read into the host device. The deduplication means to eliminate the overlap between a data item to be written in the storage device by the host device and the data items which have already been written in the storage device but not cached in the host device.

In addition, for the host device to eliminate duplications, the process of protecting data is needed in consideration of the malfunction, power failure, or the like of the host device. When the storage device is shared by a plurality of host devices, an access from one host device to another must be excluded for data protection to eliminate duplications in the data items in the storage device. That is, distributed exclusion must be realized between host devices.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing an exemplary configuration of a storage system according to an embodiment;

FIGS. 2A and 2B show examples of logical disk volumes;

FIG. 3 shows a block table and a logical disk volume table stored in a storage unit of a storage device;

FIG. 5 is a flowchart showing an exemplary procedure for a data write process on the host device side in the embodiment;

FIG. 6 is a flowchart showing an exemplary procedure for a first-type data write process on the storage device side in the embodiment;

FIGS. 11A and 11B show exemplary logical disk volumes to explain a second example of the data write process in the embodiment;

FIG. 12 shows an exemplary block table cache and an exemplary logical disk volume table cache to explain the second example of the data write process in the embodiment;

FIG. 13 shows an exemplary block table and an exemplary logical disk volume table to explain the second example of the data write process in the embodiment;

FIG. 15 is a flowchart showing an exemplary procedure for a data read process on the storage device side in the embodiment;

FIGS. 16A and 16B show exemplary logical disk volumes to explain a data read process in the embodiment;

DETAILED DESCRIPTION

Figure 4:
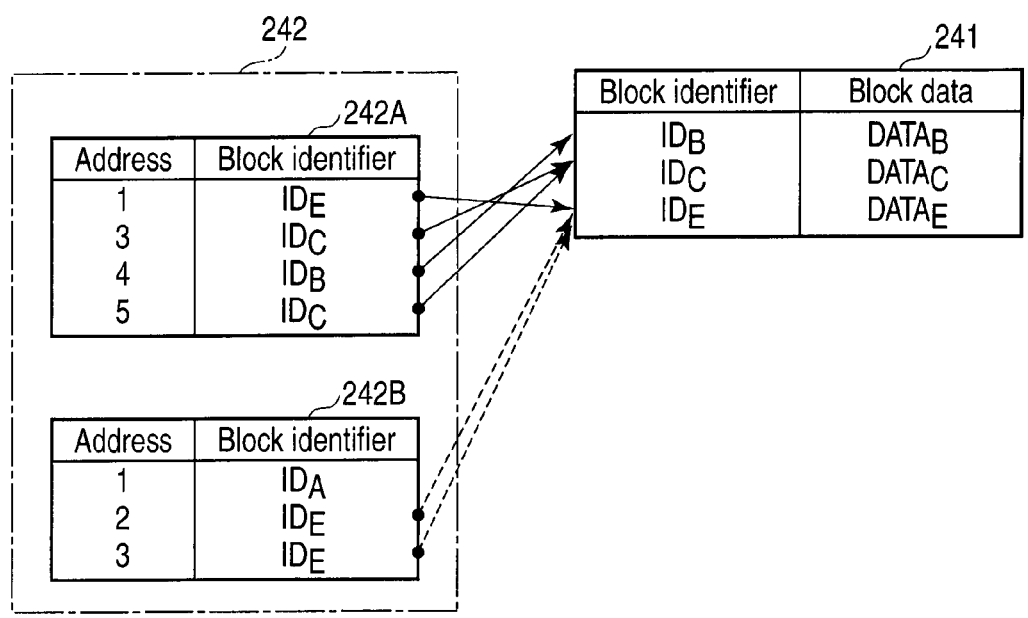
FIG. 4 shows a block table cache and a logical disk volume table cache stored in a cache unit of a host device.

In general, according to one embodiment, a storage apparatus comprises a first storage unit, a second storage unit, a control module, a block identifier generation module and a comparison module. The first storage unit is configured to store block data items and block identifiers unique to the block data items such that the block data items and the block identifiers are associated with each other. The second storage unit is configured to store addresses of block data items and block identifiers unique to the block data items such that the addresses and the block identifiers are associated with each other. The control module is configured to process requests from a host apparatus, the host apparatus comprising a cache. The block identifier generation module is configured to generate a block identifier unique to a block data item specified by the control module. The comparison module is configured to compare the block data item specified by the control module with block data items stored in the first storage unit. The control module is configured to specify a first block data item for the comparison module when a write request to specify the writing of data into the storage apparatus has been generated at the host apparatus and when a first-type write request including the first block data item and a first address of the first block data item has been transmitted from the host apparatus to the storage apparatus because the first block data item has coincided with none of the block data items stored in the cache of the host apparatus, the data to be written into the storage unit being processed in units of block data items and including the first block data item. The control module is further configured to (a1) cause the block identifier generation module to generate a first block identifier unique to the first block data item, (a2) store the first block identifier and the first block data item in the first storage unit such that the first block identifier and the first block data item are associated with each other, (a3) store the first address and the first block identifier in the second storage unit such that the first address and the first block identifier are associated with each other and (a4) transmit the first block identifier to the host apparatus in order to cause the host apparatus to store the first block identifier and the first block data item in the cache of the host apparatus such that the first block identifier and the first block data item are associated with each other and to store the first address and the first block identifier in the cache such that the first address and the first block identifier are associated with each other when the result of comparison by the comparison module based on the specification in the first block data item has shown that the first block data item has coincided with none of the block data items stored in the first storage unit. The control module is still further configured to store a second address of a second block data item and a second block identifier unique to the second block data item in the second storage unit such that the second address and the second block identifier are associated with each other when the host apparatus has transmitted a second-type write request including the second block identifier and the second address to the storage apparatus because the second block data item has coincided with any one of the block data items stored in the cache of the host apparatus, the second block data item being included in the data to be written.

FIG. 1 is a block diagram showing the configuration of a storage system according to an embodiment. The storage system comprises a storage device 10 and a host device 20. The storage device 10 and host device 20 are connected to each other with a network 30, such as SAN. The storage device 10 and host device 20 may be connected to each other with a connection system other than the network 30. In addition, a plurality of host devices, including the host device 20, may be connected to the storage device 10. That is, the storage device 10 may be configured to be shared by a plurality of host devices. In the embodiment, data is divided into blocks of a specific size (hereinafter, referred to as block data items) for processing.

The storage device 10 comprises a communication module 11, a comparison module 12, an identifier generation module 13, a storage unit 14, and a control module 15. The communication module 11 performs communication between the host device 20 and storage device 10. The communication includes the reception of a data write request and a data read request from the host device 20.

The comparison module 12 compares block data items to determine identity. In the embodiment, to simplify the explanation, one sector is assumed to be one block. The embodiment is not limited to this. For instance, one block may be assumed to be composed of two or more sectors.

The identifier generation module 13 generates a block identifier, a value (identification information) unique to a block data item specified by the control module 15. That is, when having received a block data item specified by the control module 15, the identifier generation module 13 outputs a block identifier unique to the block data item. In the embodiment, a serial number is used as a block identifier. The identifier assigned to the block may only be used again after a block has been deleted from the storage device 10 and host device 20.

The storage unit 14 is used to store data. The storage unit 14 can take various structural forms, including a file system volume and a logical disk volume (logical volume). In the embodiment, it is assumed that the storage unit 14 comprises one or more logical disk volumes.

The storage unit 14 stores a block table 141 and a logical disk volume table 142. The block table 141 stores pairs of a block data item and a block identifier. The logical disk volume table 142 stores pairs of the address of a block data item (e.g., the address of a block data item on a logical disk volume, that is, a logical block address) and a block identifier. The control module 15 controls the communication module 11, comparison module 12, identifier generation module 13, and storage unit 14.

In the embodiment, it is assumed that the comparison module 12, identifier generation module 13, and control module 15 of the host device 20 are functional modules which are realized by a CPU generally included in the host device 20 which reads a program stored in the storage device of the host device 20 and executes the program. The comparison module 12, identifier generation module 13, and control module 15 may be realized by hardware.

The host device 20 includes a communication module 21, a comparison module 22, a cache unit 24, and a control module 25 to eliminate duplicated data in cooperation with the storage device 10. The communication module 21, comparison module 22, cache unit 24, and control module 25 correspond to the communication module 11, comparison module 12, storage unit 14, and control module 15, respectively. The communication module 21, comparison module 22, cache unit 24, and control module 25 are provided in, for example, a driver layer 26 of the host device 20.

FIG. 1 shows a state where a buffer 28 and a representative value generation module 29 are further provided in the driver layer 26 of the host device 20. However, as described later, the buffer 28 will be applied to a first modification of the embodiment and the representative value generation module 29 will be applied to a second modification of the embodiment. That is, the buffer 28 and representative value generation module 29 are shown in FIG. 1 to explain the first and second modifications of the embodiment. In the embodiment, the buffer 28 and representative value generation module 29 are not necessarily provided in the host device 20.

The communication module 21 performs communication between the storage device 10 and host device 20. The communication includes the transmission of a data write request and a data read request to the storage device 10. The comparison module 22 compares block data items to determine identity. The cache unit 24 is used to store data temporarily. The cache unit 24 stores a block table cache 241 and a logical disk volume table cache 242. The block table cache 241, which is a cache of the block table 141 in the storage device 10, stores pairs of a block data item and a block identifier temporarily. The logical disk volume table cache 242, which is a cache of the logical disk volume table 142 in the storage device 10, stores pairs of the address of a block data item (e.g., the address of a block data item on a logical disk volume) and an identifier.

The control module 25 controls the communication module 21, comparison module 22, and cache unit 24. The control module 25 also performs communication between a user layer 27 and a driver layer 26. The user layer 27 includes a file system, a database (DB), an application (application program), and others.

Next, a logical disk volume configured by the storage device 10, the block table 141 and logical disk volume table 142 in the storage device 10 corresponding to the logical disk volume, the block table cache 241 and logical disk volume table cache 242 in the host device 20 corresponding to the block table 141 and logical disk volume table 142 will be explained through examples. FIGS. 2A and 2B show examples of logical disk volumes configured by the storage device 10. In this example, the storage device 10 stores two types of logical disk volumes (logical volumes), logical disk volume A and logical disk volume B. In the examples of FIGS. 2A and 2B, to simplify the explanation, it is assumed that logical disk volume A is composed of five sectors (that is, 5 blocks) and logical disk volume B is composed of four sectors (that is, 4 blocks). However, it is common practice for a logical disk volume to be composed of more sectors (blocks) than in the examples of FIGS. 2A and 2B.

Block data item "$DATA_E$" is stored in a first sector (address 1) of logical disk volume A and block data item "$DATA_A$" is stored in a second sector (address 2) of logical disk volume A. Block data item "$DATA_A$" is stored in a first sector (address 1) of logical disk volume B and block data item "$DATA_E$" is stored in a second sector (address 2) of logical disk volume B. Here, an address is the address (logical block address) of a sector (block) of the volume.

FIG. 3 shows an example of the logical disk volume table 142 and block table 141 stored (or logically stored) in the storage unit 14 of the storage device 10. More specifically, FIG. 3 shows a state where logical disk volumes A and B shown in FIGS. 2A and 2B respectively are configured using the logical disk volume table 142 and block table 141 stored in the storage unit 14 of the storage device 10.

The logical disk volume table 142 stores pairs of an address (sector) and a block identifier on logical disk volumes A and B. That is, the logical disk volume table 142 stores information that represents the correspondence between addresses (sectors) and block identifiers on logical disk volumes A and B. In the embodiment, the logical disk volume table 142 is composed of a subtable 142A corresponding to logical disk volume A and a subtable 142B corresponding to logical disk volume B as shown in FIG. 3. The block table 141 stores pairs of a block identifier and a block data item.

As seen from FIG. 3, the two types of subtables, subtable 142A and subtable 142B, and the block table 141 are linked to one another with block identifiers. It should be noted that block data items (duplicated block data items) to which the same identifier has been assigned have been organized on the block table 141 or that duplications of block data items have been eliminated. For example, in FIGS. 2A and 2B, block data item "DATA$_A$" stored in the second sector of logical disk volume A and block data item "DATA$_A$" stored in the first sector of logical disk volume B are organized with block identifier "ID$_A$" on the block table 141 as shown in FIG. 3.

As described above, in the example of FIG. 3, only unique block data items and block identifiers referred to on the basis of entries of the logical disk volume table 142 have been stored in the block table 141. Applying such a data structure makes it possible to reduce the storage capacity required for the storage device 10 to store data.

FIG. 4 shows an example of the block table cache 241 and logical disk volume table cache 242. More specifically, FIG. 4 shows an example of the block table cache 241 and logical disk volume table cache 242 stored in the cache unit 24 of the host device 20 when the storage device 10 stores logical disk volumes A and B shown in FIGS. 2A and 2B respectively. In the host device 20, caches corresponding to the block table 141 and logical disk volume table 142 shown in FIG. 3 are composed of two types of table caches, the block table cache 241 and logical disk volume table cache 242.

The logical disk volume table cache 242 is composed of subtable caches 242A and 242B corresponding to logical disk volumes A and B shown in FIGS. 2A and 2B, respectively. The subtable caches 242A and 242B correspond to the subtables 142A and 142B shown in FIG. 32, respectively.

In the example of FIG. 4, the subtable cache 242A of the logical disk volume table cache 242 stores (caches) block identifiers for blocks equivalent to four of five sectors of logical disk volume A. The subtable cache 242B of the logical disk volume table cache 242 stores (caches) block identifiers for blocks equivalent to three of four sectors of logical disk volume B. Generally, the cache size is finite. Therefore, the control module 25 of the host device 20 replaces an entry to be cached by such a method as a Least Recently Used (LRU) method. Since this replacement method is well known, a detailed explanation of it will be omitted. The example of FIG. 4 shows a state where block data item "DATA$_A$" corresponding to the second sector (address 2) of logical disk volume A and the first sector (address 1) of logical disk volume B and block data item "DATA$_A$" corresponding to the fourth sector (address 4) of logical disk volume B have been discarded from the block table cache 241 by any suitable cache replacement method.

Next, the procedure for the process of writing data into the storage device 10 while the host device 20 and storage device 10 are cooperating with each other to eliminate duplications efficiently and the procedure for the process of reading data from the storage device 10 will be explained sequentially.

1. Data Write Process

Figure 7:
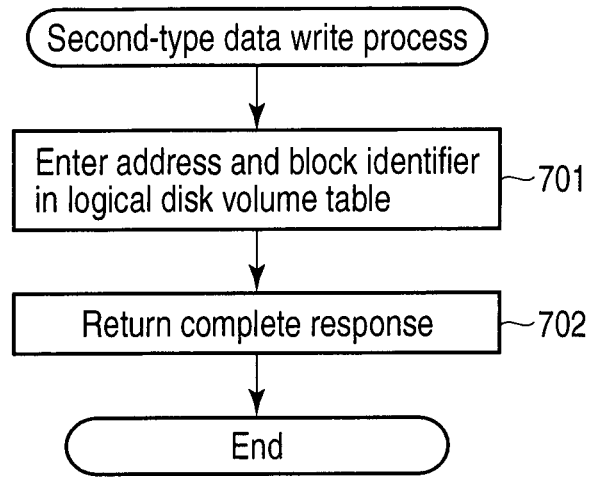
FIG. 7 is a flowchart showing an exemplary procedure for a second-type data write process on the storage device side in the embodiment.

The procedure for a data write process will be explained with reference to flowcharts in FIGS. 5 to 7. FIG. 5 is a flowchart to explain the procedure for a data write process on the host device 20 side when data is written into the storage device 10. FIGS. 6 and 7 are flowcharts to explain the procedure for a first-type and a second-type data write process on the storage device 10 side when data is written into the storage device 10.

1.1. Data Write Process on the Host Device Side

First, a data write process on the host device 20 side will be explained with reference to the flowchart of FIG. 5. Suppose the user layer 27 (more specifically, such an element as an application belonging to the user layer 27) in the host device 20 has issued a write request to the driver layer 26 in the host device 20. At this time, it is assumed that the host device 20 has reserved either logical disk volume A or B stored in the storage device 10 by request from the host device 20 to the storage device 10. In this case, the write request has data, an address (start address) on a logical disk volume (reserved by the present host device 20) into which the data is to be written, and the data length (the number of sectors) of the data as arguments. The data can be processed in blocks (sectors).

When having received a write request from the user layer 27, the control module 25 in the driver layer 26 divides data (hereinafter, referred to as write data) specified by the write request into block data items (hereinafter, referred to as write block data items) (step 501). In the embodiment, since one block is one sector, write data is divided into sectors. Hereinafter, the control module 25 controls the repetition of the following procedures in blocks (more specifically, in write block data items) (step 502).

When the data length is one (one sector), write data is used directly as a write block data item. Clearly, write data is equivalent to including one or more write block data items.

The control module 25 reads block data items sequentially from the start entry of the block table cache 241 stored in the cache unit 24 (step 503). In step 503, the control module 25 specifies the block data item for the comparison module 22 each time a block data item is read, thereby causing the comparison module 22 to compare block data items. As a result, the comparison module 22 compares the block data items read from the block table cache 241 sequentially by the control module 25 with the write block data item to be currently processed.

On the basis of the result of comparison by the comparison module 22, the control module 25 determines whether the same block data item as the write block data item (that is, a block with the same block data item) has been cached in the block table cache 241 (step 504). If the same block data item has not been cached (No in step 504), the control module 25 proceeds to step 505.

In step 505, the control module 25 transmits a first-type write request to the storage device 10 via the communication module 21 and waits for a completion response indicating the completion of a first-type data write process by the storage device 10 in response to the first-type write request. The first-type write request has the address of a write block data item and the write block data item as arguments. The first-type data write process by the storage device 10 will be described later.

Suppose, in step 505, the control module 25 has waited for the return of the completion response of the first-type data write process from the storage device 10 and received the completion response. The completion response includes the block identifier of a write block data item as described later. Therefore, having received (waited for) the completion response, the control module 25 acquires the block identifier of the write block data item from the storage device 10.

Then, the control module 25 enters a new entry, in which the address used as an argument of the first-type write request and the acquired block identifier are set and associated with each other, in the corresponding subtable cache of the logical disk volume table cache 242 stored in the cache unit 24 (step 506). In the embodiment, whether the corresponding subtable cache is either subtable cache 242A or 242B is determined depending on whether logical disk volume A or B has been reserved by the host device 20.

Furthermore, in step 506, the control module 25 enters a new entry, in which the acquired block identifier and the block data item (write block data item) used as an argument of the first-type write request are set and associated with each other, in the block table cache 241 stored in the cache unit 24. Therefore, it is assumed that a suitable cache replacement algorithm has been applied as described above to enter a new entry in each of the subtable cache of the logical disk volume table cache 242 and the block table cache 241.

If a block with the same block data item has been cached in the block table cache 241 (Yes in step 504), the control module 25 proceeds to step 507. In step 507, the control module 25 transmits a second-type write request to the storage device 10 via the communication module 21 and waits for a completion response indicating the completion of a second-type data write process by the storage device 10 in response to the second-type write request. The second-type write request has the address of a write block data item and the block identifier of the write block data item as arguments. A block identifier entered in the block table cache 241 in association with the same block data item is used to be the block identifier as the argument. The second-type data write process by the storage device 10 will be described later.

Suppose, in step 507, the control module 25 has waited for the return of the completion response of the second-type data write process from the storage device 10 and received the completion response. Then, the control module 25 enters a new entry, in which the address and block identifier used as arguments of the second-type write request are set and associated with each other, in the corresponding subtable cache of the logical disk volume table cache 242 (step 508). It is assumed that a suitable cache replacement algorithm has been applied to enter the new entry.

The control module 25 repeats the processes in steps 503 to 506 or the processes in steps 503, 504, 507, and 508 for each of the write block data items acquired in step 501 (step 502). Having finished the above processes for all of the write block data items, the control module 25 completes the data write process on the host device 20 side.

1.2. Data Write Process on the Storage Device Side 1.2.1. First-Type Data Write Process Next, the first-type data write process on the storage device 10 side will be explained with reference to a flowchart in FIG. 6. Suppose the control module 25 in the host device 20 has transmitted a first-type write request to the storage device 10 via the communication module 21. The first-type write request is received by the communication module 11 in the storage device 10 and handed to the control module 15 in the storage device 10. The first-type write request has the address of a write block data item and the write block data item as arguments as described above. That is, the first-type write request includes the address of the write block data item and the write block data item.

When having received the first-type request, the control module 15 reads block data items sequentially from the start entry of the block table 141 stored in the storage unit 14 (step 601). In step 601, the control module 25 specifies the block data item for the communication module 11 each time a block data item is read, thereby causing the comparison module 12 to compare block data items. As a result, the comparison module 22 compares the block data items read from the block table 141 by the control module 25 with the write block data item included in the first-type request.

On the basis of the result of comparison by the comparison module 12, the control module 15 determines whether the same block data item as the write block data (i.e., a block with the same block data) has been entered in the block table 141 (step 602). If the same block data item has been entered (Yes in step 602), the control module 15 proceeds to step 603.

In step 603, the control module 15 associates the address included in the first-type write request and a block identifier with each other and enters them into an entry corresponding to the address in the corresponding subtable of the logical disk volume table 142 stored in the storage unit 14 (step 603). A block identifier entered in the block table 141 in association with the same block data item is used as the entered block identifier. Whether the corresponding subtable is either subtable 142A or 142B is determined, depending on whether logical disk volume A or B has been reserved by the host device 20.

If a block with the same block data item has not been entered in the block table 141 (No in step 602), the control module 15 requests the identifier generation module 13 to generate a block identifier for the write block data item included in the first-type write request. Then, the identifier generation module 13 generates a block identifier for the write block data item, that is, a requested block identifier to be assigned to the write block data item (step S604). In the embodiment where a serial number is used as a block identifier, a number following the most recently generated block identifier is generated as the requested block identifier.

The control module 15 associates a block identifier generated by the identifier generation module 13 and a block data item to which the block identifier is to be assigned with each other and enters them in the block table 141 (step 605). In step 605, the control module 15 associates the address included in the first-type write request and the block identifier generated by the identifier generation module 13 with each other and enters them in an entry corresponding to the address in the corresponding subtable of the logical disk volume table 142.

When step 605 is executed, the write block data item is overwritten logically on the logical disk volume and an entry in the block table cache 141 might be referred to by none of the entries in logical disk volume table cache 142. The reason why such a state occurs is that the address of a logical disk volume and a block data item are managed separately in the logical disk volume table 142 and block table 141, respectively. For example, when a block data item in the first sector (address 1) of logical disk volume A is updated from block data item "$DATA_E$" to block data item "$DATA_F$," a block identifier associated with address 1 is changed, for example, from "$ID_E$" to "$ID_F$." At this time, block data item "$DATA_E$" might be left in the block table cache 141 in association with block identifier "$ID_E$." In such a case, the aforementioned state occurs. Therefore, for example, various designs, including the immediate elimination (discard) of the appropriate entry in the block table 141 or the delaying of the elimination, can be considered.

After having executed step 603 or 605, the control module 15 proceeds to step 606. In step 606, the control module 15 returns a completion response indicating the completion of the first-type data write process in response to the first-type write request to the host device 20 via the communication module 11 by using a block identifier as a return value. As a result, the control module 15 completes the first-type data write process on the storage device 10 side. If the control module 15 proceeds from step 603 to step 606, a block identifier entered in step 603 is used as a return value. If the control module 15 proceeds from step 605 to step 606, a block identifier entered in step 605 is used.

1.2.2. Second-Type Data Write Process

Next, a second-type data write process on the storage device 10 side will be explained with reference to a flowchart in FIG. 7. Suppose the control module 25 in the host device 20 has transmitted a second-type write request to the storage device 10 via the communication module 21. The second-type write request is received by the communication module 11 in the storage device 10 and handed to the control module 15 in the storage device 10. The second-type write request has the address of a write block data item and a block identifier of the write block data item as arguments as described above.

That is, the second-type write request includes the address and block identifier of the write block data item.

When having received the second-type write request, the control module 15 associates the address and block identifier included in the second-type write request with each other and enters them in an entry corresponding to the address in the corresponding subtable in the logical disk volume table 142 (step 701). Then, the control module 15 returns a completion response indicating the completion of the second-type data write process in response to the second-type write request to the host device 20 via the communication module 11 (step 701). As a result, the control module 15 terminates the second-type data write process on the storage device 10 side.

1.3. Data Write Process

Next, an example of the data write process will be explained.

1.3.1. First Example of Data Write Process

A first example of a data write process will be explained with reference to FIGS. 2A, 2B, FIGS. 3 to 7, and FIGS. 8A, 8B, 9, and 10. Suppose logical disk volumes A and B formed by the storage device 10 are as shown in FIGS. 2A and 2B respectively and the host device 20 has reserved logical disk volume A. At this time, suppose the block table 141 and logical disk volume table 142 in the state shown in FIG. 3 are stored in the storage unit 14 of the storage device 10 and the block table cache 241 and logical disk volume table cache 242 in the state shown in FIG. 4 are stored in the cache unit 24 of the host device 20.

Figures 8A, 8B:
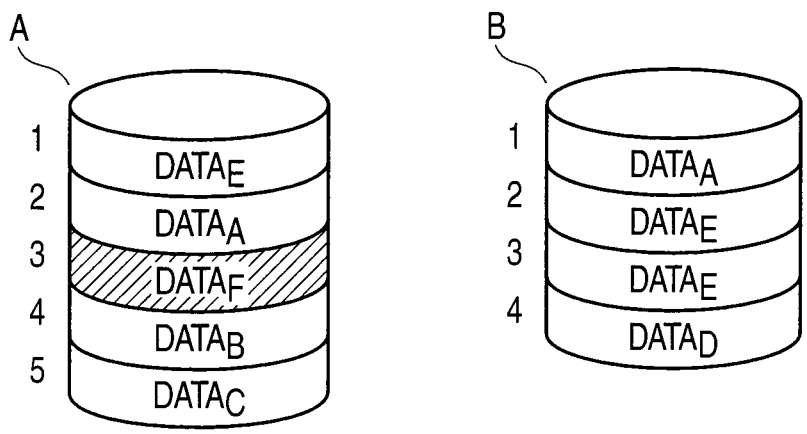
FIGS. 8A and 8B show exemplary logical disk volumes used in a first example of the data write process in the embodiment.
Figure 9:
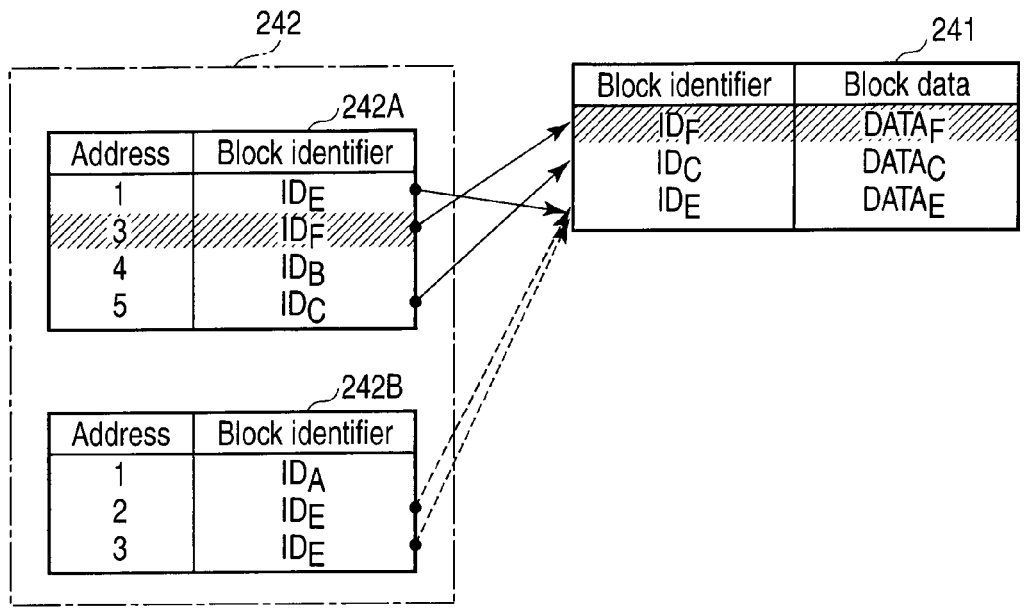
FIG. 9 shows an exemplary block table cache and an exemplary logical disk volume table cache used in the first example of the data write process in the embodiment.
Figure 10:
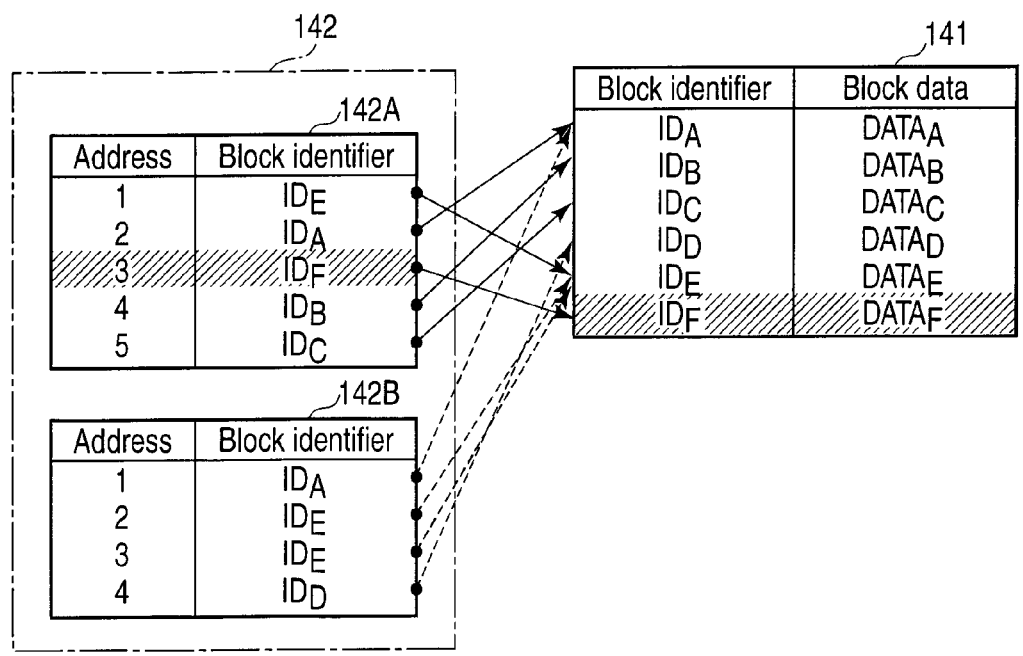
FIG. 10 shows an exemplary block table and an exemplary logical disk volume table used in the first example of the data write process in the embodiment.

In this state, the host device 20 writes block data item "$DATA_F$" logically into, for example, a third sector (address 3) of logical disk volume A. FIGS. 8A and 8B show the resulting state of logical disk volumes A and B respectively. Similarly, the state of the block table cache 241 and logical disk volume table cache 242 is shown in FIG. 9. The state of the block table 141 and logical disk volume table 142 is shown in FIG. 10.

As seen from FIG. 4, block data item "$DATA_F$" has not been cached in the block table cache 241 in the cache unit 24 of the host device (No in step 505) at the time when the process of writing block data item "$DATA_F$" is started. Therefore, the host device 20 transmits block data item "$DATA_F$" and address 3 to the storage device 10 by making a first-type write request (step 505).

Then, the storage device 10 carries out a first-type data write process. By the first-type data write process, block identifier "$ID_F$" of block data item "$DATA_F$" is generated (step 604). Then, as shown in FIG. 10, a pair of block data item "$DATA_F$" and block identifier "$ID_F$" corresponding to "$DATA_F$" is additionally entered in the block table 141 (step 605). That is, an entry in which a pair of block data item "$DATA_F$" and block identifier "$ID_F$" corresponding to "$DATA_F$" has been entered is added to the block table 141. In addition, the contents of an entry corresponding to the third sector (address 3) of logical disk volume A in the subtable 142A of the logical disk volume table 142 are updated from a pair of address 3 and block identifier "$ID_C$" shown in FIG. 3 to a pair of address 3 and block identifier "$ID_F$" (step 605).

Thereafter, the storage device 10 returns a completion response indicating the completion of the first-type data write process in the form of block identifier "$ID_F$" as a return value to the host device 20 (step 606). Then, the host device 20 replaces cache entries on the basis of the limitation of the cache size. As a result, for example, a first entry, that is, an entry in which a pair of block identifier "$ID_B$" and block data item "$DATA_B$" has been entered as shown in FIG. 4, in the block table cache 241 is replaced with an entry in which a pair of block identifier "$ID_F$" and block data item "$DATA_F$" has been entered as shown in FIG. 9 (step 506). In addition, an entry corresponding to the third sector (address 3) of logical disk volume A in the subtable cache 242A of the logical disk volume table cache 242, that is, an entry in which a pair of address 3 and block identifier "$ID_C$" has been entered as shown in FIG. 4, is replaced with an entry in which a pair of address 3 and block identifier "$ID_F$" has been entered as shown in FIG. 9 (step 506). As described above, the replacement is one example and the behavior of replacement differs depending on the cache replacement method.

1.3.2. Second Example of a Data Write Process

Next, a second example of a data write process will be explained with reference to FIGS. 5 to 7, FIGS. 8A, 8B, 9, and 10, and FIGS. 11A, 11B, 12 and 13. First, in the states as shown in FIGS. 8A, 8B, 9, and 10, the host device 20 writes block data item "$DATA_F$" in, for example, a second sector (address 2) of logical disk volume B. The resulting states of logical disk volumes A and B are shown in FIGS. 11A and 11B, respectively. Similarly, the state of block table cache 241 and logical disk volume table cache 242 is shown in FIG. 12 and the state of the block table 141 and logical disk volume table 142 is shown in FIG. 13. Suppose, at this time, the host device 20 has reserved logical disk volume B.

Unlike the first example, in the second example, block data item "$DATA_F$" has been cached in association with block identifier "$ID_F$" in the block table cache 241 in the cache unit 24 of the host device 20 (Yes in step 504) as shown in FIG. 9 at the time when the process of writing block data item "$DATA_F$" is started. Therefore, the host device 20 transmits block identifier "$ID_F$" and address 2 to the storage device 10 by making a second-type write request (step 507). It should be noted here that block identifier "$ID_F$", not block data item "$DATA_F$", is transmitted.

Then, the storage device 10 performs a second-type data write process. In the second-type data write process, an entry corresponding to the second sector (address 2) of logical disk volume B in the subtable 142B of the logical disk volume table 142, that is, an entry in which a pair of address 2 and block identifier "$ID_E$" has been entered as shown in FIG. 10 is replaced with an entry in which a pair of address 2 and block identifier "$ID_F$" has been entered as shown in FIG. 13 (step 701). Here, it should be noted that the block table 141 has not been rewritten.

Thereafter, the storage device 10 returns a completion response indicating the completion of the second-type data write process to the host device 20 (step 702). Then, in the host device 20, an entry corresponding to the second sector (address 2) of logical disk volume B in the subtable cache 242B of the logical disk volume table 142, that is, an entry in which a pair of address 2 and block identifier "$ID_E$" has been entered as shown in FIG. 9 is replaced with an entry in which a pair of address 2 and block identifier "$ID_F$" has been entered as shown in FIG. 12 (step 508). That is, the contents of the entry corresponding to the second sector (address 2) in the subtable cache 242B are updated to a pair of address 2 and block identifier "$ID_F$."

2. Data Read Process

Figure 14:
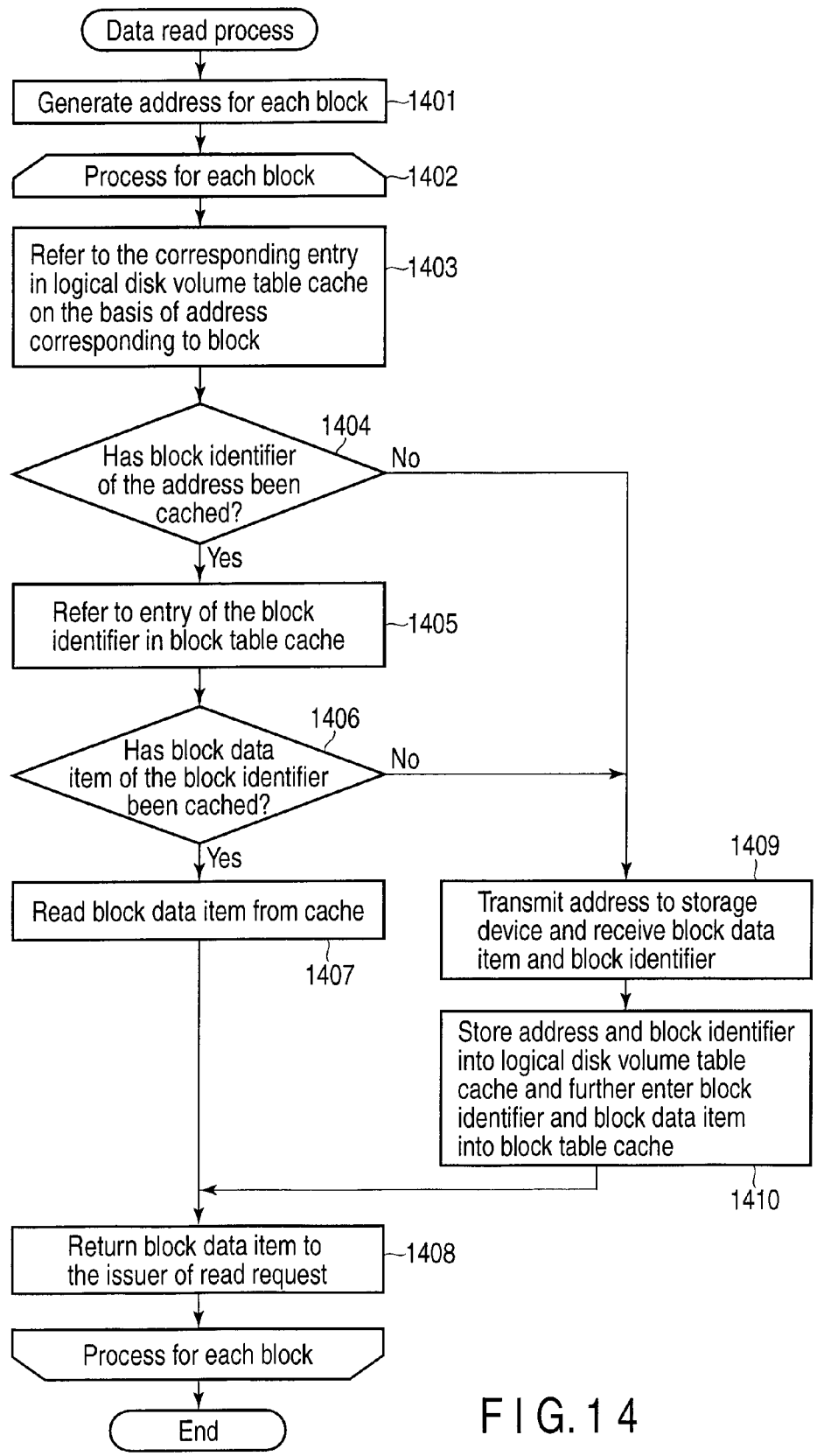
FIG. 14 is a flowchart showing an exemplary procedure for a data read process on the host device side in the embodiment.

Next, the procedure for the process of reading data stored in the storage device 10 will be explained with reference to flowcharts in FIGS. 14 and 15. FIG. 14 is a flowchart to explain the procedure for a data read process on the host device 20 side when data is read from the storage device 10. FIG. 15 is a flowchart to explain the procedure for a data read process on the storage device 10 side when data is read from the storage device 10.

2.1. Data Read Process on the Host Device Side

First, a data read process on the host device 20 side will be explained with reference to the flowchart of FIG. 14. Suppose the user layer 27 (more specifically, an element, such as an application, belonging to the user layer 27) in the host device 20 has issued a read request to the driver layer 26 in the host device 20. The read request has an address (start address) on a logical disk volume in which data to be read has been stored and the data length (the number of sectors) of the data as arguments.

When having received the read request from the user layer 27, the control module 25 in the driver layer 26 divides an address range on the logical disk volume represented by the address and data length (the number of sectors) specified by the read request into blocks and generates an address for each block (step 1401). In the embodiment, since one block is one sector, an address is generated on a sector basis. Hereinafter, the control module 25 controls the repetition of the following procedure on a block (sector) basis (more specifically, for each address corresponding to a block) (step 1402).

The control module 25 refers to the corresponding subtable cache of the logical disk volume table cache 242 on the basis of an address corresponding to a block to be processed at present (hereinafter, referred to as the present address) (step 1403). On the basis of the entry reference result, the control module 25 determines whether a block identifier has been cached in association with the present address (step 1404). That is, the control module 25 determines whether an entry in which a block identifier has been associated with the present address exists in the corresponding subtable cache of the logical disk volume table cache 242.

If a block identifier has been cached in association with the present address (Yes in step 1404), the control module 25 refers to the block table cache 241 on the basis of the block identifier (step 1405). On the basis of the entry reference result, the control module 25 determines whether a block data item has been cached in association with the block identifier (step 1406).

As described above, the control module 25 determines whether a block identifier corresponding to the present address has been cached (stored) in the logical disk volume table cache 242 and a block data item corresponding to the block identifier has been cached (stored) in the block table cache 241 (steps 1404, 1406). If a block data item has been cached (Yes in steps 1404, 1406), the control module 25 reads the block data item from the block table cache 241 (step 1407). Next, the control module 25 returns the read block data item to the user layer 27 (more specifically, the issuer of the read request in the user layer 27) (step 1408).

If a block identifier corresponding to the present address has not been cached (No in step 1404) or if a block data item corresponding to the block identifier has not been cached (No in step 1406), the control module 25 proceeds to step 1409. In step 1409, the control module 25 transmits a read request that has the address of a block data item on a logical disk volume to be read from the storage device 10 as an argument to the storage device 10 via the communication module 21 and waits for a completion response indicating the completion of the data read process by the storage device 10 in response to the read request.

Suppose, in step 1409, the control module 25 has waited for a completion response for a data read process from the storage device 10 and received the completion response. The completion response includes a block data item corresponding to the address on the logical disk volume used as an argument for the read request and the block identifier of the block data item as described later. Therefore, when having received the completion response, the control module 25 acquires the block data item specified in the read request and the block identifier of the block data item from the storage device 10.

Then, the control module 25 enters a new entry, in which the address used as an argument for the read request and the acquired block identifier have been associated with each other, in the corresponding subtable cache of the logical disk volume table cache 242 stored in the cache unit 24 (step 1410). In step 1410, the control module 25 enters a new entry, in which the acquired block identifier and block data item have been associated with each other, in the block table cache 241 stored in the cache unit 24. As described above, suppose a suitable cache replacement algorithm has been applied to enter those new entries. Next, the control module 25 returns the block data item entered in the block table cache 241 to the user layer (the issuer of the read request in the user layer 27) (step 1408).

The control module 25 repeats the processes in steps 1403 to 1408 for each of all the addresses generated in step 1401 (step 1402). When having performed the above processes, the control module 25 terminates the data read process on the host device 20 side.

2.2. Data Read Process on the Storage Device Side

Next, a data read process on the storage device 10 side will be explained with reference to the flowchart of FIG. 15. Suppose the control module 25 in the host device 20 has transmitted a read request to the storage device 10 via the communication module 21. The read request is received by the communication module 11 in the storage device 10 and handed to the control module 15 of the storage device 10. As described above, the read request has the address of a block data item to be read as an argument. That is, the read request includes the address of a block data item to be read.

Having received the read request, the control module 15 reads a block identifier associated with the address included in the read request from the logical disk volume table 142 stored in the storage unit 14 (step 1501). Then, the control module 15 reads a block data item associated with the block identifier read in step 1501 from the block table 141 stored in the storage unit 14 (step 1502).

Next, the control module 15 returns a completion response indicating the completion of the data read process in response to the read request to the host device 20 via the communication module 11, with the block data item read from the block table 141 and the block identifier of the block data item as return values (1503). By doing this, the control module 15 terminates the data read process on the storage device 10 side.

2.3. Example of Data Read Process

Next, an example of the data read process will be explained with reference to FIGS. 11A and 11B, FIGS. 12 to 15, and FIGS. 16A, 16B, 17, and 18. Suppose logical disk volumes A and B formed by the storage device 10 are in the states shown in FIGS. 11A and 11B respectively and the host device 20 has reserved logical disk volume A. In this case, suppose the block table cache 241 and logical disk volume table cache 242 in the state of FIG. 12 have been stored in the cache unit 24 of the host device 20 and the block table 141 and logical disk volume table 142 in the state of FIG. 13 have been stored in the storage unit 14 of the storage device 10.

In this state, suppose the host device 20 reads a block data item in, for example, the second sector (address 2) of logical disk volume A. That is, suppose, in the host device 20 (more specifically, the user layer 27 of the host device 20), a read request to read a block data item in the second sector (address 2) of logical disk volume A has been generated. The read request includes address 2 on logical disk volume A and the data length representing the number of blocks (the number of sector) 1.

In this case, the host device 20 carries out a data read process for reading a block data item only in address 2 of logical disk volume A. As seen from FIG. 12, an entry that includes address 2 of logical disk volume 2 does not exist in the subtable cache 242A of the logical disk volume table cache 242. That is, the block identifier of the block data item in address 2 of logical disk volume A has not been cached in association with address 2 in the subtable cache 242A of the logical disk volume table cache 242 (No in step 140). Accordingly, the block data item in address 2 of logical disk volume A has not been cached in the block table cache 241.

Then, to acquire the block data item (here, "$DATA_A$") in address 2 of logical disk volume A and its block identifier (here, "$ID_A$"), the host device 20 transmits a read request that has address 2 of logical disk volume A as an argument to the storage device 10 via the communication module 21 (step 1409).

Then, the storage device 10 performs a data read process. In the data read process at the storage device 10, block identifier "$ID_A$" associated with address 2 is read from the entry in which address 2 of logical disk volume A has been entered in the subtable 142 of the logical disk volume table 142 (or the hatched entry in the subtable 142A shown in FIG. 18) (step 1501). Moreover, block data item "$DATA_A$" associated with block identifier "$ID_A$" is read from the entry in which the block identifier "$ID_A$" has been entered in the block table 141 (or the hatched entry in the block table 141 shown in FIG. 18) (step 1502).

Figure 17:
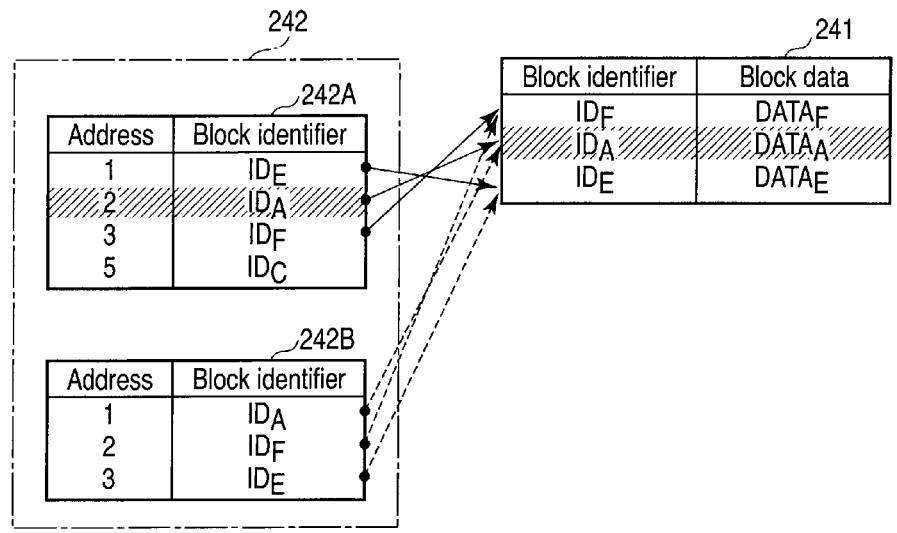
FIG. 17 shows an exemplary block table cache and an exemplary logical disk volume table cache to explain a data read process in the embodiment.
Figure 18:
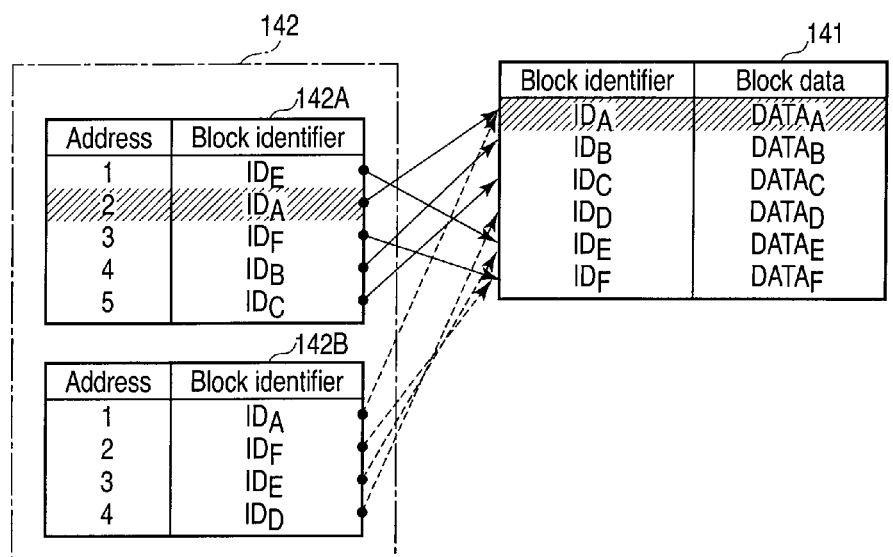
FIG. 18 shows an exemplary block table and an exemplary logical disk volume table to explain a data read process in the embodiment.

Thereafter, the storage device 10 returns a completion response including block data item "$DATA_A$" and its block identifier "$ID_A$" as return values to the host device 20 (step 1503). Then, in the host device 20, an entry in which a pair of address 2 of logical disk volume A and block identifier "$ID_A$" of block data item "$DATA_A$" has been set is entered in the subtable cache 242A of the logical disk volume table cache 242 (step 1410). Here, the entry of the fourth sector (address 4) of logical disk volume A in the subtable cache 242A shown in FIG. 12 is discarded and an entry in which a pair of address 2 and block identifier "$ID_A$" have been set is entered. That is, the entry of the fourth sector (address 4) of logical disk volume A in the subtable cache 242A shown in FIG. 12 is replaced with an entry in which a pair of address 2 and block identifier "$ID_A$" has been entered (or the hatched entry in the subtable cache 242A) as shown in FIG. 17.

Moreover, in step 1410, an entry in which a pair of block identifier "$ID_A$" of block data item "$DATA_A$" and the block data item "$DATA_A$" has been set is entered in the block table 141. Here, the entry of block identifier "$ID_C$" in the block table cache 241 shown in FIG. 12 is discarded and an entry in which a pair of block identifier "$ID_A$" and block data item "$DATA_A$" have been set is entered. That is, the entry of block identifier "$ID_A$" in block table cache 241 shown in FIG. 12 is replaced with an entry in which a pair of block identifier "$ID_A$" and block data item "$DATA_A$" has been entered (or the hatched entry in the block table cache 241) as shown in FIG. 17 by cache entry replacement. It should be noted that, since block data item "$DATA_A$" of block identifier "$ID_A$" has been entered in the block table cache 241, the entry of the first sector (address 1) in the subtable cache 242B of the logical disk volume table cache 242 also indicates the block data item "$DATA_A$" as shown in FIG. 17.

As described above, in the embodiment, when the host device 20 writes data into the storage device 10, the storage device 10 performs a comparison and duplication determination process (steps 601, 602) to determine whether a block data item overlapping with the block data item (the write block data item) has been already stored in the storage device 10. The storage device 10 assigns a unique block identifier to a block data item determined to overlap with no write block data item as the result of the determination process. Since the processes are carried out intensively at the storage device 10, even if a plurality of host devices including the host device 20 share the storage device 10, there is no need to exclude accesses to host devices to protect data, that is, to execute distributed exclusion.

Furthermore, in the embodiment, a unique block identifier assigned to a block data item by the storage device 10 is returned from the storage device 10 to the host device 20. In the host device 20, a pair of the block identifier and block data item is entered (or cached) in the cache unit 24. Then, in the embodiment, when the host device 20 writes data into the storage device 10, the host device 20 first compares the block data item (or write block data item) with the block data items cached in the cache unit 24 of the host device 20 and further determines whether the former overlaps with the latter (steps 503, 504). In the host device 20, if a duplication has been detected, the block identifier cached in association with the block data item is transmitted from the host device 20 to the storage device 10 in place of the block data item. As a result, when block data items with the same pattern are frequently written from the host device 20 into the storage device 10, the deduplication process can be off-loaded from the storage device 10 to the host device 20, making it possible to reduce the amount of data transferred between the host device 20 and storage device 10. Accordingly, the embodiment can perform the deduplication process at much higher speed and speed up the data write process more than in the conventional art. Moreover, according to the embodiment, block data items are held in the block table cache 241 in deduplication form in the host device 20. Therefore, much more cache data can be virtually held with a less memory capacity.

The embodiment is based on the assumption that the host device 20 has reserved either logical disk volume A or B. However, the host device 20 need not always have reserved either logical disk volume A or B. In this case, information on either logical disk volume A or B to be written or read, for example, a logical disk volume number, should be included in a write request or a read request.

First Modification

Next, a first modification of the embodiment will be explained with reference to FIG. 1. The first modification differs from the embodiment in that a buffer 28 is used. Suppose the buffer 28 is provided in the driver layer 26 of the host device 20 as shown in FIG. 1. The buffer 28 is controlled by the control module 25. The control module 25 stores a write request (e.g., a write request from, for example, an application in the user layer 27) including data (write data) issued from the user layer 27 of the host device 20 to the driver layer 26 in the buffer 28.

For example, when the write requests stored in the buffer 28 have reached the buffer size, or when the elapsed time from the time when the latest one of the write requests stored in the buffer 28 was read have reached a threshold value, the control module 25 reads a write request to be executed next from the buffer 28. The control module 25 carries out the same data write process as in the embodiment according to the write request read from the module 28. Moreover, when a read request has been issued from the user layer 27 to the driver layer 26, the control module 25 refers to the buffer 28 before referring to the logical disk volume table cache 242 according to the read request. The control module 25 refers to the buffer 28 to determine whether the latest data (target data) corresponding to an address for data readout has been stored in the buffer 28. If the target data has been stored, the control module 25 reads the data from the buffer 28 and makes a response to the user layer 27 (the issuer of the read request).

As described above, according to the first modification of the embodiment, the write process can be made faster by storing a write request including write data in the buffer 28 in the host device 20. The host device 20 can make a write process much faster by applying a method of concatenating write data items whose addresses are consecutive included in a plurality of write requests or changing the order in which write data items are written. Moreover, according to the first modification, the number of duplicated data elimination processes can be reduced when an overwrite process is repeated at the same address. As described above, since only the latest data has to be processed, this helps make the write process faster.

Second Modification

Next, a second modification of the embodiment will be explained with reference to FIG. 1. The second modification differs from the embodiment in that a representative value generation module 29 is used. Suppose the representative value generation module 29 is provided in the driver layer 26 of the host device 20 as shown in FIG. 1. The representative value generation module 29 is used by the control module 25 of the host device 20.

When having received a block data item as an input, the representative value generation module 29 outputs a block representative value corresponding to the block data item. A hash function, such as SHA1, can be used for the representative value generation module 29 to output (or generate) a block representative value on the basis of a block data item. In this case, the hash value of the block data item can be used as a block representative value. Suppose the size of the block representative value (the storage capacity necessary to store the block representative value) is smaller than the size of the corresponding block data item.

In the second modification, not only a block identifier unique to the block data item but also a block representative value generated on the basis of the block data item are held in each of the block table 141 stored in the storage unit 14 of the storage device 10 and the block table cache 241 stored in the cache unit 24 of the host unit 20. That is, in each of the block table 141 and block table cache 241, not only the block identifier unique to the block data item and the block data item are held in association with each other, but also the block Representative value of the block data item and the block data item are held in association with each other. With the configuration of the table or table cache where the block identifier, block representative value, and block data item are held in association with one another, it is difficult to search for the block representative value at high speed. Therefore, besides the table or table cache, an index, such as a B tree, may be used to search for a block representative value at high speed.

In the second modification, the control module 25 of the host device 20 generates a block representative value of a write block data item using the representative value generation module 29 before comparing block data items to detect duplications (identity) in step 503 of the data write process shown in FIG. 5. Then, the representative value generation module 29 compares the generated block representative value with a block representative value entered (or cached) in each entry of the block table cache 241 in association with a block data item and a block identifier.

If having detected that the generated block representative value coincides with the cached block representative value, the control module 25 compares only the block data items corresponding to the coinciding block representative values with each other. That is, the control module 25 compares the write block data item with the block data items of the block representative value, cached in the block table cache 241, that coincides with the generated block representative value of the write block data item, thereby detecting (or determining) the identity of both block data items. If coincidence (or identity) has been detected as a result of the comparison of block data items, the control module 25 determines a cache hit. If coincidence has not been detected, the control module 25 determines a cache mishit. Since the size of block representative values is smaller than that of block data items, the control module 25 can make a comparison (or a cache hit determination) at much higher speed.

When having determined a cache mishit, the control module 25 transmits a first-type write request to the storage device 10. Unlike in the embodiment, the first-type write request includes a block representative value in addition to the address of a write block data item and the write block data item.

In the storage device 10 which has received the first-type write request from the host device 20, the control module 15 makes the following comparison before comparing block data items to detect duplications (identity) in step 601 of the data write process shown in FIG. 6. The control module 15 compares a block representative value included in the first-type write request with a block representative value entered in association with a block data item and a block identifier in each entry of the block table 141.

If having detected that the block representative value included in the request coincides with the entered block representative value, the control module 15 compares the block data items corresponding to the coinciding block representative values with each other, thereby detecting (determining) the identity of both block data items. If having detected coincidence (or identity) as a result of the comparison of block data items, the control module 15 operates as follows because a block data item overlapping with the write block data item has been stored in the block table 141. The control module 15 does not enter a block data item in the block table 141 and enters the address (i.e., the address included in the first-type write request), the block identifier and the block representative value in an entry corresponding to the address in the corresponding subtable of the logical disk volume table 142 in such a manner that the address is associated with the block identifier and block representative value.

If coincidence has not been detected as a result of the comparison of block data items, a block data item overlapping with the write block data item has not been stored in the block table 141. Therefore, the control module 15 enters the block identifier, the block representative value and the block data item (i.e., the write block data item) in the block table 141 in such a manner that the identifier, the block representative value and the block data item are associated with one another. Moreover, the control module 15 enters the address (i.e., the address included in the first-type write request), the block identifier and the block representative value in an entry corresponding to the address in the corresponding subtable of the logical disk volume table 142 in such a manner that the address is associated with the block identifier and block representative value.

As described above, in the second modification of the embodiment, block representative values smaller in data size than the block data item are compared before block data items are compared in each of the host device 20 and storage device 10. If coincidence has been detected, only the block data items corresponding to the coinciding block representative values are compared with each other. This makes it possible to compare the write block data item with block data items much faster than when the write block data item is compared with block data items stored in the block table cache 241 or block table 141 sequentially.

As described in BACKGROUND, in a deduplication process, not data itself but representative values (specifically, hash values) determined from data items are compared frequently. Theoretically, there is a possibility that representative values will conflict with one another. If a conflict occurs, data destruction will take place. In this connection, various devices have been considered. To avoid the problem, data items themselves have to be compared. However, the comparison of data items themselves results in a high cost.

In contrast, in the second modification of the embodiment, first, block representative values smaller in data size than block data items are compared with one another. If coincidence has been detected, only the block data items corresponding to the block representative values that coincide with one another are compared. By doing this, the number of times the data items are compared is decreased and therefore a deduplication process can be carried out much faster. In the second modification, the storage device 10 uses block representative values generated by the host device 20 and therefore there is no need to generate block representative values on the storage device 10 side.

Third Modification

Next, a third modification of the embodiment will be explained with reference to FIG. 1. It is assumed that the storage device 10 is shared by a plurality of host devices, including the host device 20. The control module 25 of the host device 20 requests the storage device 10 to exclude another host device related to a deduplication operation before writing or reading data into or from the storage device 10. As the granularity of exclusion, for example, the unit of logical disk volumes or an address range (or address space) where a specific logical disk volume exists can be specified.

If there is no collision of exclusion requests between the host device 20 and another host device, the control module 15 of the storage device 10 that has received an exclusion request from the host device 20 informs the host device 20 of exclusion success. In contrast, if there is a collision of exclusion requests, the control module 15 informs not only the host device 20 of exclusion failure but also the other host device already informed of exclusion success of the end (or removal) of exclusion.

When the host device 20 has received a notice of exclusion success from the storage device 10, the control module 25 of the host device 20 carries out a data write process or a data read process as in the embodiment. That is, when the storage device 10 has received an exclusion request from the host device 20, if the host device 20 does not conflict with another host device in an exclusion request and there is no competition between host devices including the host device 20 in data writing and data reading, the storage device 10 informs the host device 20 of exclusion success, thereby performing deduplication in cooperation with the host device 20. The notice of exclusion success can be said to be an instruction to cooperate with the host device 20 for deduplication given by the storage device 10 or an instruction to transfer a part of the function of performing deduplication from the storage device 10 to the host device 20.

In contrast, when the host device 20 has received a notice of exclusion failure, the control module 25 of the host device 20 transmits, for example, a write request or a read request issued from the user layer 27 directly to the storage device 10 without performing a data write process or a data read process as in the embodiment. Another host device which has received a notice of exclusion end terminates the deduplication process as in the embodiment.

As described above, according to the third modification of the embodiment, for example, a part of the function of performing deduplication is transferred to the host device 20 only when a logical disk volume has been reserved in the host device 20, thereby preventing data from being destroyed by the competition for writing between the host device 20 and another host device. Moreover, when a part of the address range in a logical disk volume has been locked onto, for example, a host device other than the host device 20, a part of the function of performing deduplication is transferred to the host device 20 only in an access to the part of the address range, thereby preventing data destruction due to the competition for writing between the host device 20 and another host device.

Furthermore, when the load on the storage device 10 has exceeded, for example, the threshold value, the storage device 10 may transfer a part of the function of performing deduplication to the host device 20 and perform deduplication in cooperation with the host device 20. That is, the storage device 10 may switch cooperation with the host device 20 dynamically, depending on the load status of the storage device 10.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage apparatus comprising:
a first storage unit configured to store block data items and block identifiers unique to the block data items such that the block data items and the block identifiers are associated with each other;
a second storage unit configured to store addresses of block data items and block identifiers unique to the block data items such that the addresses and the block identifiers are associated with each other;
a control module configured to process requests from a host apparatus, the host apparatus comprising a cache;
a block identifier generation module configured to generate a block identifier unique to a block data item specified by the control module; and
a comparison module configured to compare the block data item specified by the control module with block data items stored in the first storage unit,
wherein:
the control module is configured to specify a first block data item for the comparison module when a write request to specify the writing of data into the storage apparatus has been generated at the host apparatus and when a first-type write request including the first block data item and a first address of the first block data item has been transmitted from the host apparatus to the storage apparatus because the first block data item has coincided with none of the block data items stored in the cache of the host apparatus, the data to be written into the storage apparatus being processed in units of block data items and including the first block data item;

the control module is further configured to (a1) cause the block identifier generation module to generate a first block identifier unique to the first block data item, (a2) store the first block identifier and the first block data item in the first storage unit such that the first block identifier and the first block data item are associated with each other, (a3) store the first address and the first block identifier in the second storage unit such that the first address and the first block identifier are associated with each other and (a4) transmit the first block identifier to the host apparatus in order to cause the host apparatus to store the first block identifier and the first block data item in the cache of the host apparatus such that the first block identifier and the first block data item are associated with each other and to store the first address and the first block identifier in the cache such that the first address and the first block identifier are associated with each other when the result of comparison by the comparison module based on the specification in the first block data item has shown that the first block data item has coincided with none of the block data items stored in the first storage unit; and the control module is still further configured to store a second address of a second block data item and a second block identifier unique to the second block data item in the second storage unit such that the second address and the second block identifier are associated with each other when the host apparatus has transmitted a second-type write request including the second block identifier and the second address to the storage apparatus because the second block data item has coincided with any one of the block data items stored in the cache of the host apparatus, the second block data item being included in the data to be written.

2. The storage apparatus according to claim 1, wherein the control module is configured to (b1) store a third block identifier in the second storage unit such that the third block identifier is associated with the first address and (b2) transmit the third block identifier to the host apparatus in order to cause the host apparatus to store the third block identifier and the third block data item in the cache of the host apparatus such that third block identifier and the third block data item are associated with each other and to store the first address and the third block identifier in the cache such that the first address and the third block identifier are associated with each other when the result of comparison by the comparison module based on the specification in the first block data item has shown that the first block data item has coincided with the third block data item, the third block identifier being stored in the first storage unit in association with the third block data item, the third block data item being one of the block data items stored in the first storage unit.

3. The storage apparatus according to claim 2, wherein the control module is configured to (c1) acquire a fourth block identifier stored in the second storage unit in association with a fourth address of a fourth block data item, (c2) acquire a block data item stored in the first storage unit in association with the fourth block identifier as the fourth block data item, and (c3) transmit the fourth block identifier and the fourth block data item to the host apparatus when the host apparatus has generated a first read request to read data from the storage apparatus and when the host apparatus has transmitted a second read request including the fourth address of the fourth block data item to the storage apparatus because the fourth block data item included in the data to be read has not been stored in the cache of the host apparatus, the data to be read being processed in units of block data items.

4. The storage apparatus according to claim 1, wherein:

the first storage unit is configured to add block representative values generated on the basis of block data items and smaller in size than the block data items to block identifiers unique to the block data items and store the block representative values and block identifiers and the block data items such that the block representative values and block identifiers are associated with the block data items;

the first-type write request includes a first block representative value generated on the basis of the first block data item by the host apparatus in addition to the first block data item and the first address;

the comparison module is configured to compare a block representative value specified by the control module with the block representative values stored in the first storage unit sequentially; and the control module is configured to (d1) specify the first block representative value included in the first-type write request for the comparison module before specifying the first block data item, (d2) store the first block identifier, the first block representative value, and the first block data item in the first storage unit such that the first block identifier, the first block representative value, and the first block data item are associated with one another and further store the first address and the first block identifier in the second storage unit such that the first address and the first block identifier are associated with each other when the result of comparison by the comparison module based on the specification in the first block representative value has shown that the first block representative value has coincided with none of the block representative values stored in the first storage unit.

5. The storage apparatus according to claim 4, wherein the control module is configured to (e1) cause the comparison module to compare the fourth block data item, stored in the first storage unit in association with fourth block representative value, with the first block data item when the result of comparison by the comparison module based on the specification in the first block representative value has shown that the fourth block representative value has coincided with the first block representative value and (e2) store the fourth block identifier, stored in the first storage unit in association with the fourth block data item, in the second storage unit such that the fourth block identifier is associated with the first address and transmit the fourth block identifier and the fourth block representative value to the host apparatus in order to cause the host apparatus to store the fourth block identifier, the fourth block representative value and the fourth block data item in the cache of the host apparatus such that the fourth block identifier, the fourth block representative value and the fourth block data item are associated with one another and further cause the host apparatus to store the first address and the fourth block identifier in the cache such that the first address and the fourth block identifier are associated with each other when the first block data item has coincided with the fourth block data item.

6. The storage apparatus according to claim 1, wherein the control module is configured to give the host apparatus an instruction to transfer to the host apparatus a second process included in a first process for deduplication necessary when the write request has been generated at the host apparatus, the second process including a determination of whether each of the block data items included in the data to be written has been stored in the cache of the host apparatus.

7. The storage apparatus according to claim 6, wherein the control module is configured to give the transfer instruction to the host apparatus when the writing of data into the storage apparatus or the reading of data from the storage apparatus by the host apparatus does not compete with the writing or reading of data by another host apparatus.

8. A storage system comprising:
  a storage apparatus comprising a first storage unit, a second storage unit, a first control module, a block identifier generation module, and a first comparison module; and
  a host apparatus comprising a first cache, a second cache, a second control module, and a second comparison module,
  wherein:
  the first storage unit is configured to store block data items and block identifiers unique to the block data items such that the block data items and the block identifiers are associated with each other;
  the second storage unit is configured to store addresses of block data items and block identifiers unique to the block data items such that the addresses of the block data items and the block identifiers are associated with each other;
  the first control module is configured to process requests from the host apparatus;
  the block identifier generation module is configured to generate a block identifier unique to a block data item specified by the first control module,
  the first comparison module is configured to compare the block data item specified by the first control module with block data items stored in the first storage unit;
  the first cache is configured to store block data items and block identifiers unique to the block data items such that the block data items and the block identifiers are associated with each other;
  the second cache is configured to store addresses of block data items and block identifiers unique to the block data items such that the addresses of the block data items and the block identifiers are associated with each other,
  the second control module is configured to process requests generated at the host apparatus, and
  the second comparison module is configured to compare the block data item specified by the second control module with the block data items stored in the first cache,
  wherein the second control module is configured to
  (a1) specify for the second comparison module each of the block data items constituting data to be written into the storage apparatus when a write request for the writing has been generated at the host apparatus, the data to be written being processed in block data items;
  (a2) transmit a first-type write request including a first block data item and a first address of the first block data item to the storage apparatus when the result of comparison by the second comparison module based on the specification by the second control module has shown that the first block data item has coincided with none of the block data items stored in the first cache, the first block data item being included in the data to be written;
  (a3) transmit a second-type write request including a second block identifier, stored in the first cache such that the second block identifier is associated with any one of the block data items stored in the first cache, and a second address of the second block data item to the storage apparatus when the result of comparison by the second comparison module has shown that the second block data item has coincided with any one of the block data items stored in the first cache, the second block data item being included in the data to be written;
  (a4) store a first block identifier unique to the first block data item and the first block data item in the first cache such that the first block identifier and the first block data item are associated with each other and further store the first address and the first block identifier in the second cache such that the first address and the first block identifier are associated with each other when the storage apparatus has returned the first block identifier as a completion response to the first-type write request; and
  (a5) store the second address and the second block identifier in the second cache such that the second address and the second block identifier are associated with each other according to a completion response from the storage apparatus to the second-type write request, and
  wherein the control module is configured to
  (b1) specify the first block data item for the first comparison module when the first-type write request has been received by the storage apparatus;
  (b2) cause the block identifier generation module to generate the first block identifier unique to the first block data item when the result of comparison by the first comparison module based on the specification by the second control module has shown that the first block data item has coincided with none of the block data items stored in the first storage unit;
  (b3) store the first block identifier and the first block data item in the first storage unit such that the first block identifier and the first block data item are associated with each other;
  (b4) store the first address and the first block identifier in the second storage unit such that the first address and the first block identifier are associated with each other;
  (b5) transmit the first block identifier as a completion response to the first-type write request to the host apparatus after having stored the first block identifier and first block data item and the first address and first block identifier;
  (b6) store the second address and the second block identifier in the second storage unit such that the second address and the second block identifier are associated with each other when the storage apparatus has received the second-type write request; and
  (b7) transmit a completion response to the second-type write request to the host apparatus after having stored the second address and the second block identifier.

9. A method of eliminating duplicated data by a storage apparatus in cooperation with a host apparatus in a storage system comprising the storage apparatus and the host apparatus, the storage apparatus comprising a first storage unit, a second storage unit, a first comparison module, a block identifier generation module, and a first control module, and the host apparatus comprising a first cache, a second cache, a second comparison module, and a second control module, the method comprising:
  causing the second comparison module to compare each of the block data items constituting data to be written into the storage apparatus with block data items stored in the first cache when a write request for the writing has been generated at the host apparatus, the data to be written into the storage apparatus being processed in block data items;

causing the second control module to transmit a first-type write request including a first block data item and a first address of the first block data item to the storage apparatus when the result of comparison by the second comparison module has shown that the first block data item has coincided with none of the block data items stored in the first cache, the first block data item being included in the data to be written, causing the first comparison module to compare the first block data item with the block data items stored in the first storage unit when the storage apparatus has received the first-type write request;

causing the block identifier generation module to generate a first block identifier unique to the first block data item when the result of comparison by the first comparison module has shown that the first block data item has coincided with none of the block data items stored in the first storage unit;

causing the first control module to store the first block identifier and the first block data item in the first storage unit such that the first block identifier and the first block data item are associated with each other;

causing the first control module to store the first address and the first block identifier in the second storage unit such that the first address and the first block identifier are associated with each other, causing the first control module to transmit the first block identifier as a completion response to the first-type write request to the host apparatus after the first control module has stored the first block identifier and first block data item and the first address and first block identifier;

causing the second control module to store the first block identifier and the first block data item in the first cache such that the first block identifier and the first block data item are associated with each other when the host apparatus has received the first block identifier as the completion response to the first-type write request;

causing the second control module to store the first address and the first block identifier in the second cache such that the first address and the first block identifier are associated with each other when the host apparatus has received the first block identifier as the completion response to the first-type write request;

causing the second control module to transmit a second-type write request including a second block identifier stored in the first cache in such a manner that the second block identifier corresponds to any one of the block data items stored in the first cache and a second address of the second block data item to the storage apparatus when the result of comparison by the second comparison module has shown that the second block data item has coincided with any one of the block data items stored in the first cache, the second block data item being included in the data to be written;

causing the first control module to store the second address and the second block identifier in the second storage unit such that the second address and the second block identifier are associated with each other when the storage apparatus has received the second-type write request;

causing the first control module to transmit a completion response to the second-type write request to the host apparatus after the first control module has stored the second address and second block identifier; and causing the second control module to store the second address and the second block identifier in the second cache in such a manner that the former corresponds to the latter according to a completion response to the second-type write request.

10. The method according to claim 9, further comprising:
causing the first control module to store a third block identifier stored in the first storage unit in such a manner that the third block identifier corresponds to a third block data item and the first address in the second storage unit in such a manner that the former corresponds to the latter when the result of comparison by the first comparison module has shown that the first block data item has coincided with the third block data item, the third block data item being one of the block data items stored in the first storage unit;

causing the first control module to transmit the third block identifier as a completion response to the first-type write request to the host apparatus after the first control module has stored the third block identifier and the first address;

causing the second control module to store the third block identifier and the third block data item in the first cache such that the third block identifier and the third block data item are associated with each other when the host apparatus has received the third block identifier as the completion response to the first-type write request; and causing the second control module to store the first address and the third block identifier in the second cache such that the first address and the third block identifier are associated with each other when the host apparatus has received the third block identifier as the completion response to the first-type write request.

11. The method according to claim 9, wherein:
the first storage unit is configured to add block representative values generated on the basis of block data items and smaller in size than the block data items to block identifiers unique to the block data items and store the block representative values and block identifiers and the block data items such that the block representative values and block identifiers are associated with the block data items; and the first-type write request includes a first block representative value generated on the basis of the first block data item by the host apparatus in addition to the first block data item and the first address, and the method further comprises:
causing the first comparison module to compare the first block representative value with the block representative values stored in the first storage unit before the comparison of the first block data item;

causing the first control module to store the first block identifier, the first block representative value, and the first block data item in the first storage unit such that the block identifier, representative value, and block data item are associated with one another when the result of comparison by the first comparison module has shown that the first block representative value has coincided with none of the block representative values stored in the first storage unit; and causing the first control module to store the first address and the first block identifier in the second storage unit such that the first address and the first block identifier are associated with each other when the result of comparison by the first comparison module has shown that the first block representative value has coincided with none of the block representative values stored in the first storage unit.

* * * * *